United States Patent
Kuiper et al.

(10) Patent No.: US 7,251,392 B2
(45) Date of Patent: Jul. 31, 2007

(54) REDUCTION OF DRIVING VOLTAGE IN A SWITCHABLE ELEMENT

(75) Inventors: Stein Kuiper, Eindhoven (NL); Christina Adriana Renders, Eindhoven (NL); Bernardus Hendrikus Wilhelmus Hendriks, Eindhoven (NL); Robert Andrew Hayes, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/555,260

(22) PCT Filed: May 5, 2004

(86) PCT No.: PCT/IB2004/050585

§ 371 (c)(1), (2), (4) Date: Nov. 1, 2005

(87) PCT Pub. No.: WO2004/099846

PCT Pub. Date: Nov. 18, 2004

(65) Prior Publication Data

US 2006/0215273 A1   Sep. 28, 2006

(30) Foreign Application Priority Data

May 6, 2003   (EP) .................................. 03076378

(51) Int. Cl.
G02B 6/26 (2006.01)
G02B 3/12 (2006.01)
(52) U.S. Cl. ............................ 385/16; 385/40; 359/666
(58) Field of Classification Search .................... None
See application file for complete search history.

(56) References Cited

U.S. PATENT DOCUMENTS

| | | | |
|---|---|---|---|
| 6,360,775 B1 * | 3/2002 | Barth et al. .................. | 137/828 |
| 6,825,068 B2 * | 11/2004 | Denis et al. ................. | 438/149 |
| 7,027,683 B2 * | 4/2006 | O'Connor et al. ............ | 385/19 |
| 7,033,985 B2 * | 4/2006 | Noyes et al. ................ | 510/407 |
| 2002/0037130 A1 * | 3/2002 | McBride et al. ............. | 385/16 |
| 2003/0012483 A1 * | 1/2003 | Ticknor et al. .............. | 385/16 |

* cited by examiner

*Primary Examiner*—Sung Pak
*Assistant Examiner*—Tina M. Wong
(74) *Attorney, Agent, or Firm*—Michael E. Blek

(57) ABSTRACT

A switchable element is described, which comprises a fluid chamber (111) containing a polar (101) and a non-polar (102) liquid, which are immiscible. The element is further provided with two electrodes (103,104), which are arranged to control the spatial distribution of the liquids, by means of an applied voltage across two the two electrodes. By the addition of surfactant to one or both of the liquids, the actuation voltage of the element is lowered. The element can work for example as an optical device or a motor.

11 Claims, 2 Drawing Sheets

REDUCTION OF DRIVING VOLTAGE IN A SWITCHABLE ELEMENT

FIELD OF THE INVENTION

The present invention relates to switchable elements, and to devices including switchable elements.

TECHNICAL BACKGROUND

Electro-wetting is essentially the phenomenon whereby an electric field modifies the wetting behavior of a polar liquid in contact with a hydrophobic surface. By applying an electric field, a surface energy gradient is created in the polar liquid, which can be used to manipulate the liquid. In common applications, water is used as the polar liquid.

Recently, switchable elements have been proposed and demonstrated to operate based on the principle of electro-wetting. Such switchable elements typically consist of a closed cell that is filled with one part of water and one part of oil, although other liquids might also be used. The important characteristics are that the liquids are immiscible and that one of them is polar and or electrically conducting (e.g. water), while the other one is non-polar (e.g. oil). Other liquid parameters of importance, when the device is used as an optical element, are for example refractive index, melting point, transmission and density.

Since the liquids are immiscible, a well-defined interface will always be present between them. The inner surface of the cell generally comprises two separate surfaces, one that is hydrophobic and one that is non-hydrophobic. The hydrophobic surface will by nature reject the water, and by configuring the surfaces properly the spatial relationship between the liquids can be predetermined, i.e. the water is forced to a predetermined location opposite the hydrophobic surface. Consequently, also the interface between the two liquids can be predetermined.

Furthermore two electrodes are arranged in the cell, one address electrode arranged behind the hydrophobic and electrically insulating coating and one counter electrode in direct contact with or capacitively coupled to the conducting liquid. By applying a potential between the electrodes, an electric field is created across the insulating coating. The electric field gives rise to an electrostatic force that overrides the force of attraction exercised by the molecules in the conducting liquid and thus modifies the spatial relation between the liquids and consequently also the shape and position of the liquid interface. In effect, the liquid interface can be controlled by means of controlling the applied potential.

There are several known principles exploiting this mechanism and with which a cell can be controlled. According to a first principle the liquids are chosen to have different transmission properties. By changing the spatial distribution of the liquids, the transmission of the component is varied. According to a second principle, the liquids are chosen to have different indices of refraction. This turns the meniscus between the liquids into a lens having refractive properties that can be controlled by means of the electrode potential. Typically, this lens can be changed between a convex, light focusing state and a concave, light defocusing state. In this document an OFF-state refers to a condition, wherein an applied voltage between the electrodes is substantially zero. Further, and an ON-state refers to a condition, wherein an applied voltage causes a substantial change in spatial distribution of the liquids, compared to the OFF-state.

Electro wetting cells are further described in WO2002/099527, WO2003/069380 and WO2004/027489.

These electro-wetting elements can be arranged to work as different optical and other components, for example as motor, variable focus lenses, variable diaphragms, variable filters, gratings, beam deflectors, mechanical actuators and electro-wetting based displays. When these electro-wetting elements are used in portable devices, the power consumption and the actuation voltages of the device are of particular importance. If the actuation voltage is too high it might be necessary to include additional electronics to drive the device. Such additional electronics has a number of drawbacks, one being increased development and manufacturing costs of the device. Another drawback related to a high power consumption might be that batteries of the portable device need to be recharged so frequently, that use of the portable device is substantially restricted.

SUMMARY OF THE INVENTION

It is an object of the present invention to eliminate, or at least alleviate, the above described problems related to power consumption and actuation voltage in electro-wetting devices.

This object is achieved by a method and a device in accordance with the appended claims 1 and 10, respectively. Preferred embodiments are defined in the dependent claims.

The invention is based on a realization of the inventors, that by affecting the surface tension of the liquids in an optical element, one can lower the voltage needed to control the optical cell without substantially altering its optical performance.

Equation (1) shows how the voltage can be influenced by changing the surface tensions between a first non-polar liquid NPL and a second polar liquid PL, which are comprised in an electro wetting cell.

$$\gamma_{NPL/PL}\cos\theta = \gamma_{NPL/wall} - \gamma_{PL/wall} + \frac{\varepsilon_0\varepsilon_r}{2d}V^2 \qquad (1)$$

$\gamma$ are the various interfacial tensions, $\theta$ is the contact angle between the meniscus and the wall of the fluid chamber, measured through the conducting liquid. Apart from the correct interfacial tension the liquids must fulfill also a series of other requirements, like having appropriate refractive indices, melting points, transmissions, densities, viscosities etc. Therefore, depending on the choice of the liquids, only a limited choice of discrete values for the three interfacial tensions is possible.

Thus, according to a first aspect thereof, the present invention provides a switchable element. The element comprises a fluid chamber, which comprises a first and a second body of fluid. The first fluid is a non-conducting liquid, and the second fluid is a polar and/or electrically conducting liquid. Said element further comprises a first and a second electrode, which are arranged to control the spatial distribution of said liquids. Finally, at least one of said first and second fluids comprises a surfactant According to a second aspect thereof, the invention provides a device, which comprises said switchable element.

One of the advantages of changing the surface tension by dissolving surfactants in the liquids, is that one can affect the surface tension, and by this the actuation voltage, without substantially changing other characteristic parameters of the liquids. This is due to the fact that the surfactants predominantly influence interfaces. Therefore they are only needed in small amounts, and thereby they hardly influence the bulk properties of the liquids. The man skilled in the art could by way of experiments, and by the aid of the further explanations below, determine the amount of surfactants that is needed in a specific case.

A switchable device, wherein the surface tension between said first and second liquids has been affected in the way that is defined in claim 2, advantageously influences the only surface tension that affects the sensitivity of the contact angle with respect to the applied voltage. A desired change in contact angle between the meniscus and the wall of the fluid chamber, can be achieved by adjusting the voltage applied to the electrodes. As can be seen in equation 1, the only surface tension affecting the amount of voltage needed to achieve a certain change in contact angle, is the surface tension between the two liquids. In other words, a lower $\gamma_{NPL/PL}$ lowers the voltage needed to effect a certain change in contact angle.

A switchable device, wherein the surface tension between the cell wall and said first or second liquids, as defined in claim 3 or 4, has the advantage of enabling an adjustment of the contact angle in the OFF-state, which does not influence the sensitivity of the contact angle with respect to the applied voltage.

These and other aspects of the invention will be apparent from and elucidated with reference to the embodiments described hereinafter.

DETAILED DESCRIPTION OF THE INVENTION

Figure 1:
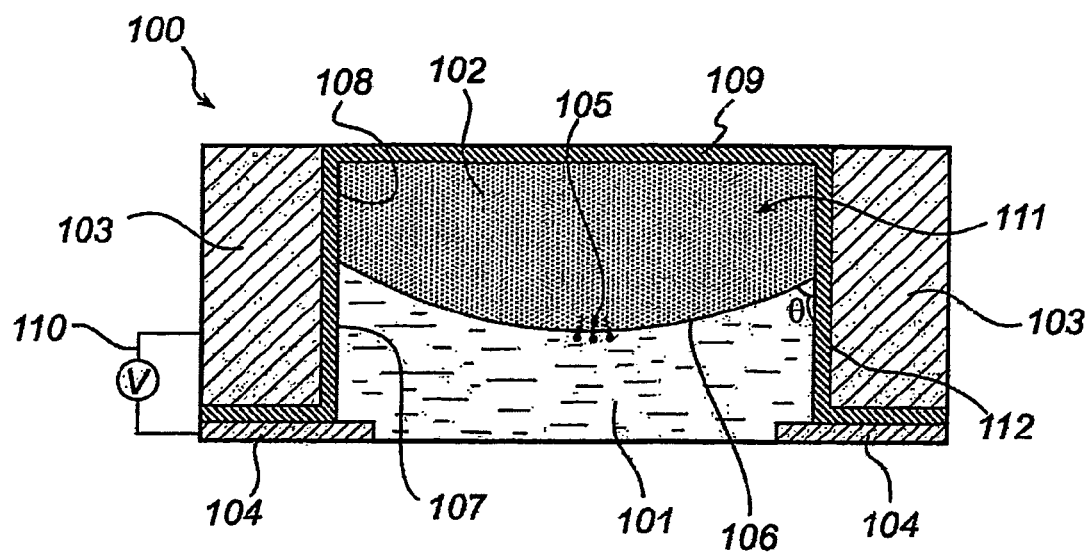
FIG. 1 schematically shows a side view of an embodiment of the present invention, wherein the surfactant affects the interfacial tension between a polar and a non-polar liquid.

In this description, identical or corresponding parts have identical or corresponding reference numerals. The invention will now be described in further detail, with reference to FIG. 1. Although FIG. 1 illustrates a switchable element, which is used as an variable focus lens, it is understood that the invention applies equally well to other kinds of electro-wetting elements, such as motors, variable diaphragms, filters, gratings, beam deflectors, motors and electro-wetting based displays.

FIG. 1 schematically shows a side view of a switchable optical element 100. The switchable optical element 100 comprises a closed cell or fluid chamber 111, which contains a first 101 and a second 102 body of fluid. Said fluids 101, 102 are substantially immiscible. Said first fluid 101 preferably is water, which is a polar and electrically conducting fluid, or liquid, and said second fluid 102 preferably is oil, which is a non-polar liquid. When a polar and a non-polar liquid are in contact with each other, a meniscus is formed between them, i.e. between said first 101 and second 102 liquids. One way of measuring the shape of the meniscus is to measure an angle $\theta$ 112 between a wall of the cell 111 and the common surface between said first and second liquids 101, 102.

Further, said switchable optical element comprises a first electrode 103 and a second electrode 104, wherein said second electrode 104 is in contact with said first liquid 101. Between the first electrode 103 and the liquids 101, 102, there is an hydrophobic insulator 109, such that said first 103 electrode is not in contact with said liquids 101 and 102. Moreover, said switchable optical element is arranged such that the electrical voltage 110 between said two electrodes 103, 104 can be varied. As can be seen from Equation 1, the angle $\theta$ 112 is dependent, among other parameters, on the interfacial surface tension $\gamma_{NPL/wall}$ 108 between the oil 102 and a wall of the cell 111, as well as on the interfacial surface tension $\gamma_{PL/wall}$ 107 between the water 101 and a wall of the cell 111. By increasing the difference in interfacial surface tension between these two parameters 107, 108, the angle 112 is increased, without affecting the sensitivity of the contact angle with respect to the applied voltage, and by decreasing it the angle 112 is decreased, still without affecting said sensitivity.

Another, more dynamic, way of changing the angle 112, is to change the applied voltage 110. The amount with which the angle is changed, in response to a certain change in applied voltage, can be derived from Equation 1. The equation gives that by lowering the interfacial surface tension 106 between the water and the oil, the voltage level required to change the angle 112 by a certain amount is decreased.

A preferred way of lowering the interfacial surface tensions 106, 107, 108 is to add surfactant 105 to said first liquid 101 or said second liquid 102. An example of a surfactant 105 that is able to influence the interfacial surface tension between oil and water, is an alcohol, for example decanol. If the wall consists of fluorocarbon (e.g. Teflon™ AF1600 produced by DuPont™) in combination with a hydrocarbon oil, the surface tension between the oil and the wall 108 can be influenced, for example, by molecules with a hydrocarbon part and a fluorocarbon part. With the same wall the surface tension between the water and the wall can be influenced by molecules with a polar head and a fluorocarbon tail, for example a fluorinated alcohol. Surfactants can decrease surface tensions significantly already in very low concentrations, and thus driving voltages can decrease significantly by the use of surfactants, while not affecting bulk properties of the liquids. Examples of surfactants for the wall/water interface are 2,2,3,4,4,4-hexafluoro-1-butanol and 2,2,3,3,4,4,4-heptafluoro-1-butanol. Surfactants that can be used for the wall/oil interface are pentafluorophenyltrimethylsilane, trifluoromethyltrimethylsilane and trifluoromethyltriethylsilane.

Figure 2:
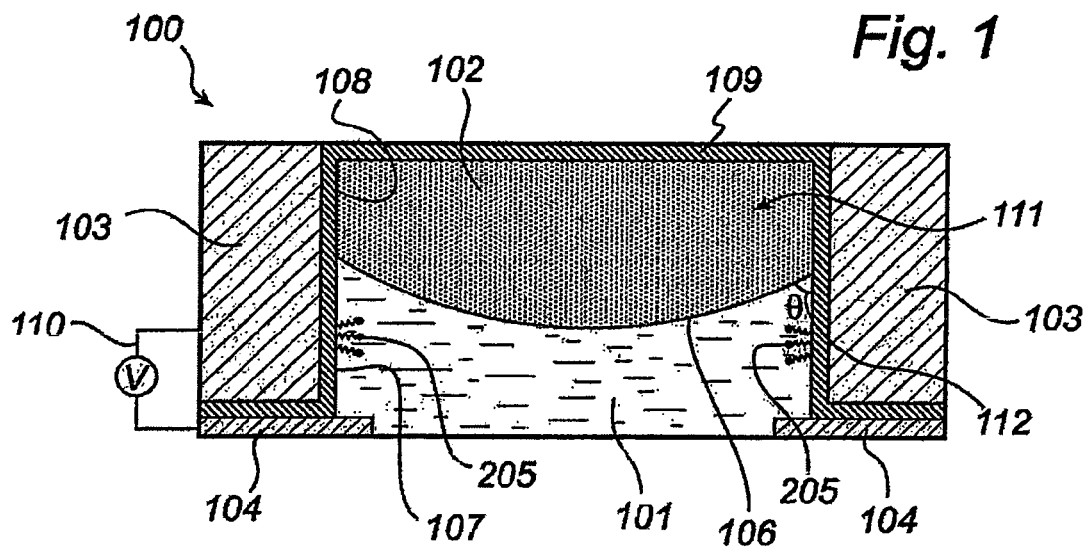
FIG. 2 schematically shows a side view of an embodiment of the present invention, wherein the surfactant affects the interfacial tensions between a non-polar liquid and a wall of the cell.
Figure 3:
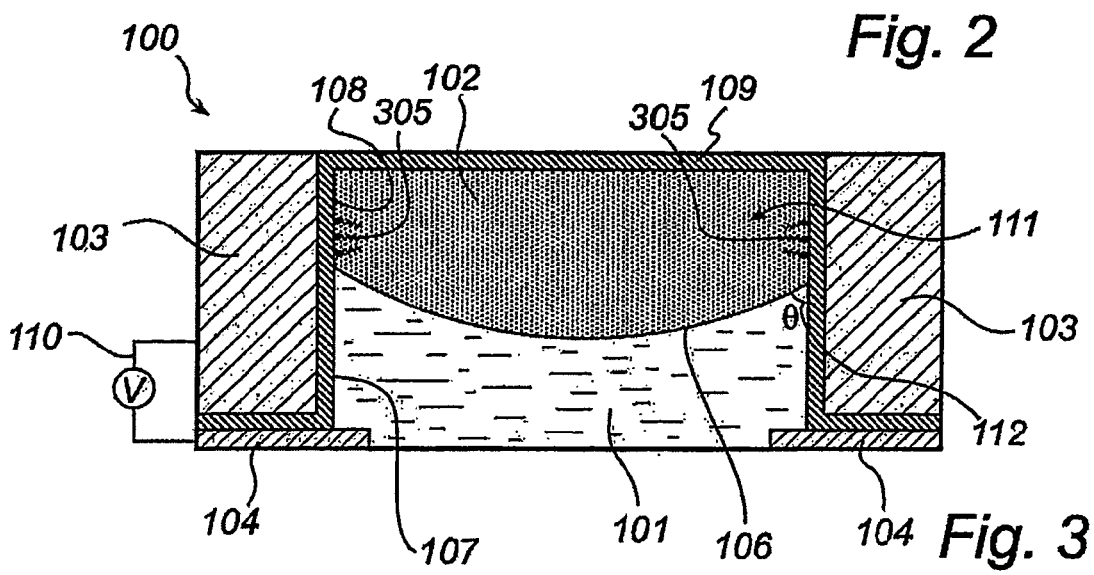
FIG. 3 schematically shows a side view of an embodiment of the present invention, wherein the surfactant affects the interfacial tensions between a polar liquid and a wall of the cell.

FIGS. 2 and 3 illustrate the fact that there are surfactants that influence also the interfacial surface tension between said liquids and the wall surrounding the liquids, as stated above. It is understood that many surfactants influence not only one of these interfacial surface tensions, but two if not all three of them, to various extent.

As to the amount of surfactant that should be added to the liquid the concentration is dependent of a number of factors. One factor is the ratio between the area of the interfacial surface and the liquid volume, where a higher concentration is required for a larger ratio than for a smaller ratio. Thus, generally, a larger liquid body requires a smaller concentration of the surfactant for obtaining the same effect as in a smaller liquid body. Further, it is desired to keep the concentration as low as possible while achieving a desired influence on the interfacial surface tension. On the other hand, increasing the concentration means increasing the influence, but only to a certain extent. When the interfacial surface is saturated with surfactant(s) the full effect is obtained. If there are still surfactant molecules left within the liquid 101, 102 these will, or at least may, cause undesired negative effects on the properties of the switchable element. A state that is often desired to obtain is where the interfacial surface, and in particular the meniscus, is covered with at least one monolayer of surfactant. The strongest effects of adding a surfactant can be obtained at the interfacial surface between water and oil and between water and the wall of the cell 111.

Figure 4A:
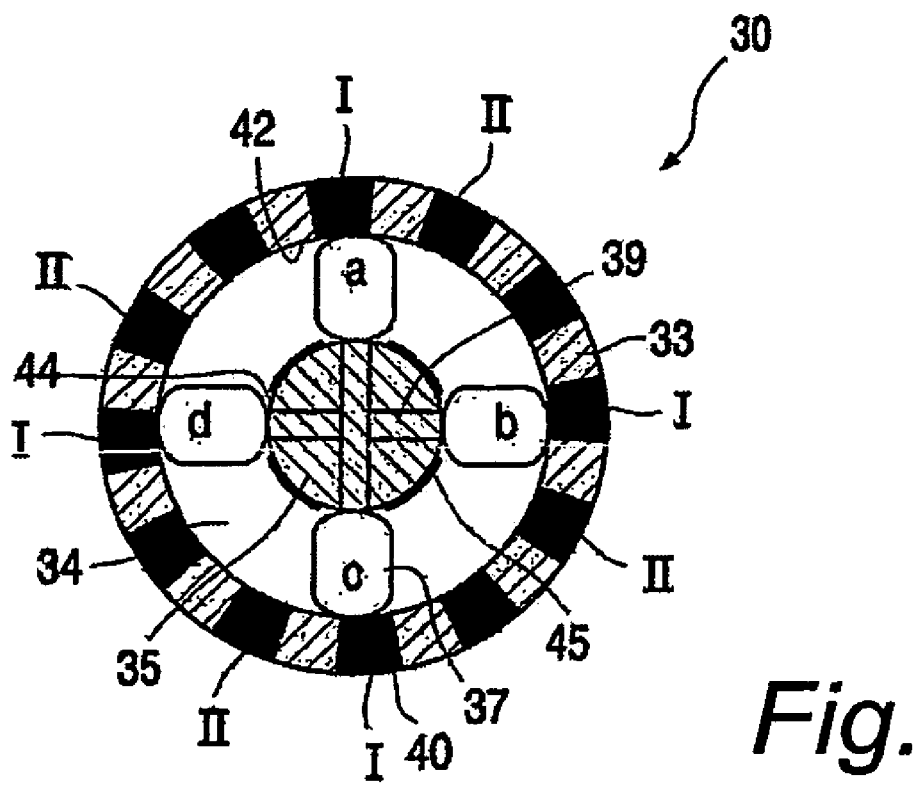
FIGS. 4a and 4b shows, in a cross-sectional view, an activated electrowetting motor at two different moments in time.
Figure 4B:
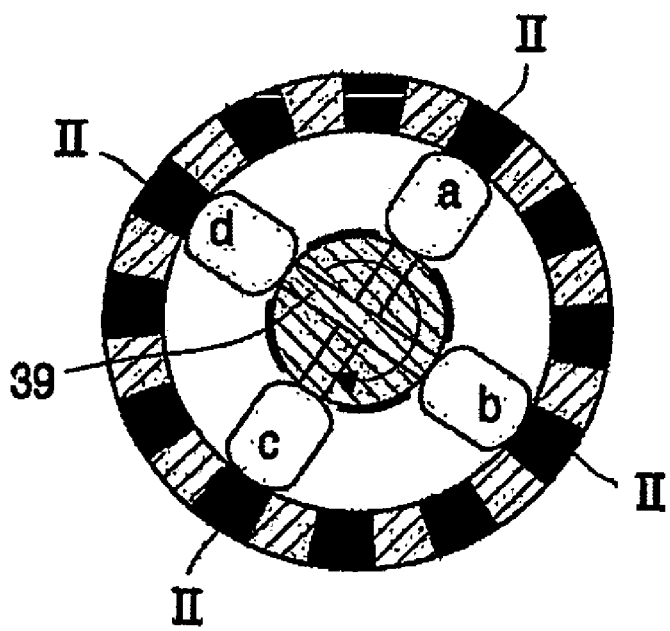

The invention may also be used in an electrowetting motor wherein use is made of the fact that the shape of the interface can be changed by means of an electric force, on the basis of the wetting technique, for manipulating a volume of a fluid along a predetermined path. FIGS. 4A and 4B show a cross-sectional view of an embodiment of such a motor 30, in particular a rotary motor, at different time moments. The motor comprises a substantially cylindrical first body 33 and a substantially cylindrical second body 35, which is concentrically positioned within the first body 33. The first and second body 33, 35 enclose between their respective inner and outer surface a substantially cylindrical chamber 34, which is filled with a non-polar and/or non-conductive first fluid 36, such as an oil, and volumes 37a–d of a polar and/or conductive second fluid 37, in this example an aqueous solution, for instance (salted) water. The fluids 36, 37 are immiscible.

The first body 33 is provided with means for varying the wettability of its inner surface, namely twelve electrodes 40 extending in axial direction of the first body 33, spaced at substantially regular radial intervals along the circumference. The inner surface of the first body 33 is covered with a layer 42 of electrically insulating, hydrophobic material or more generally, a material having a wettability by the second fluid 37 which is lower than the wettability by the first fluid 36. Examples of such material are for instance Teflon-like materials like the amorphous fluoropolymer AF1600 provided by Dupont or parylene or a combination thereof, in case where the first fluid 36 is an oil or air and the second fluid is (salted) water. The electrodes 40 are connected to a voltage supply (not shown).

The second body 35 is of solid design but could be hollow, if so desired, and is mounted movably, in particular rotatably, in the first body 33 by one or more suitable bearings. The or each bearing could for instance be an oil bearing, configured by providing the first and/or second body 33, 35 with an annular groove, in which upon rotation of the second body 35, pressure will build up, centering the second body 35 in the first body 33.

The second body 35 is provided at its outer surface with coupling means in the form of four hydrophilic areas 44, said number corresponding to the number of volumes 37a–d. These areas 44 could for instance be made of or covered by a material having a wettability by the second fluid 37 that is higher than the wettability by the first fluid 36, which material could for instance be glass. The areas 44 are separated from each other in radial direction by areas 45, made of or covered by hydrophobic material, which could be a selection from any of the materials mentioned before. Additionally or alternatively, the hydrophilic areas 44 may be recessed to enhance the coupling force with the volumes. Furthermore, two or more of the volumes 37a–d could be interconnected via at least one suitable conduit 39 in second body 35, as illustrated in broken lines in FIGS. 4A and 4B. The areas of high and low wettability 44, 45 may be omitted, but can also be maintained, to increase the maximum force of the motor may exert.

A motor as described above operates as follows. In FIG. 4A the electrodes 40 marked with Roman numerals I (that is the upper, lower, left and right electrodes) are supplied with a voltage. Consequently, the hydrophobic layer 42 covering said electrodes I will become locally hydrophilic. The four volumes 37a–d will therefore contact the first body 33 at the four electrodes I. They furthermore contact the second body 35 at the coupling means, that is the hydrophilic areas 44 and the conduits 39. If subsequently the voltage supply is shifted to second electrodes II, situated next tot the former electrodes I, the layer above said second electrodes II will become hydrophilic, whereas the layer above the first electrodes I will switch back to hydrophobic. This gives rise to electrowetting forces which draw the volumes 37a–d towards the hydrophilic areas II as shown in FIG. 4B. During this movement the volumes 37a–d will move along the hydrophilic area 44 of the second body 35 up to the edge of the hydrophobic area 45. Further movement along the second body 35 will be blocked by the combined action of the hydrophobic area 45 and the first fluid 36, enabling the volumes 37a–d to exert a wetting force on the second body 35, which will cause the body 35 to rotate. Hence by sequentially activating successive electrodes 40 I, II with a suitable voltage, the second body 35 can be rotated continuously. Preferably, the electrodes 40 are positioned relatively close to each other or even overlap through a "tooth" structure. Also, the radial dimensions of the electrodes 40 are preferably equal to or smaller than the radial dimensions of the volumes 37a–d. Such positioning and/or dimensioning of the electrodes 40 will ensure that the volumes 37a–d can "sense" a newly supplied voltage to a succeeding electrode 40 II.

In the given example the rotation is clockwise. It will be appreciated that this direction can be readily reversed by reversing the order in which the electrodes 10 I, II are activated. Obviously, the frequency of rotation will depend on the activation frequency of successive electrodes 40 I, II. It is noted that although in the illustrated example four volumes 37a–d of conductive fluid are used, any number of volumes can be used. The volumes 37a–d may be line-shaped in axial direction or consist of a series of axially spaced droplets. It is further noted that with the embodiment of FIGS. 4A and 4B, it is also possible to have the first body 33 rotate instead of the second body 35, provided that the first body 33 is rotatable mounted and the second body 35 is fixed. In that case, upon switching the voltage from the first I to the second electrodes II, the volumes 37a–d would move towards the second electrodes II (featuring the higher wettability) up till the edge of the hydrophilic area 44. Subsequently, the second electrodes II due to wetting forces would be drawn to the volumes 37a–d, causing the first body 33 to rotate anti-clockwise. From this discussion it is also immediately clear that for the operation of the motor 30 it is irrelevant whether the electrodes 40 are positioned on the static body or the movable body. Therefore, although in practice the electrodes 40 will usually be placed on the static body to avoid wiring problems, the presented embodiment should in no way be seen as limiting.

Consequently, as described above, the present invention presents a way to lower the driving voltage in a switchable devices. It is to be noted, that for the purposes of this application, and in particular with regard to the appended claims, the word "comprising" does not exclude other elements or steps, that the word "a" or "an", does not exclude a plurality, and that at least some of the means can be implemented in either hardware or software, which per se will be apparent to a person skilled in the art.

The invention claimed is:

1. A switchable element comprising:
   a chamber (111), comprising a first body of fluid (101) and a second body of fluid (102), said first body of fluid being at least one of a of a polar liquid and a conducting liquid and said second body of fluid being a non-conducting liquid;
   a first electrode (103) and a second electrode (104), which are arranged to control spatial distribution of said first and second liquids upon the application of a voltage between said first and second electrodes; and
   wherein at least one of said first and second bodies of fluid comprises a surfactant (105) for affecting surface tension to lower the magnitude of said voltage required to control the switchable element.

2. A switchable element according to claim 1, wherein said surfactant (105) affects the interfacial tension (106) between said first and said second bodies of fluid (101, 102).

3. A switchable element according to claim 1, wherein said surfactant (205) affects the interfacial tension (107) between said first body of fluid (106) and at least one wall (109) of said closed cell (111).

4. A switchable element according to claim 1, wherein said surfactant (305) affects the surface tension (108) between said second body of fluid (102) and at least one of the walls (109) of said closed cell (111).

5. A switchable element according to claim 1, wherein said surfactant (105; 205; 305) is an alcohol.

6. A switchable element according to claim 1, wherein said surfactant (105; 205; 305) is a molecule having a hydrocarbon or fluorcarbon part.

7. A switchable element according to claim 1, wherein said surfactant (105) is at least one surfactant chosen from a group of surfactants comprising 2,2,3,4,4,4-hexafluoro-1-butanol and 2,2,3,3,4,4,4-heptafluoro-1-butanol.

8. A switchable element according to claim 1, wherein said surfactant (105) is at least one surfactant chosen from a group of surfactants comprising pentafluorophenyltrimethylsilane, trifluoromethyltrimethylsilane and trifluoromethyltriethylsilane.

9. A switchable element according to claim 1, wherein said element is a switchable optical element.

10. A switchable element according to claim 1, wherein said element is a motor.

11. A device comprising a switchable element (100) according to claim 1.

* * * * *